United States Patent
Hill et al.

(10) Patent No.: US 9,222,403 B2
(45) Date of Patent: Dec. 29, 2015

(54) FUEL TREATMENT SYSTEM AND METHOD

(71) Applicant: Thrival Tech, LLC, Ashland, OR (US)

(72) Inventors: Garrett Hill, Ashland, OR (US); Scott Lazar, Ashland, OR (US); Dustin Stonehouse, Ashland, OR (US)

(73) Assignee: Thrival Tech, LLC, Ashland, OR (US)

( * ) Notice: Subject to any disclaimer, the term of this patent is extended or adjusted under 35 U.S.C. 154(b) by 0 days.

(21) Appl. No.: 13/870,119

(22) Filed: Apr. 25, 2013

(65) Prior Publication Data

US 2014/0216400 A1     Aug. 7, 2014

Related U.S. Application Data

(60) Provisional application No. 61/762,224, filed on Feb. 7, 2013.

(51) Int. Cl.
| | |
|---|---|
| *F02B 27/02* | (2006.01) |
| *F02M 35/10* | (2006.01) |
| *F02B 31/04* | (2006.01) |
| *F02M 9/12* | (2006.01) |
| *F02M 29/06* | (2006.01) |

(Continued)

(52) U.S. Cl.
CPC ............. *F02B 27/0268* (2013.01); *F02B 31/04* (2013.01); *F02D 9/12* (2013.01); *F02M 9/124* (2013.01); *F02M 17/10* (2013.01); *F02M 19/082* (2013.01); *F02M 27/04* (2013.01); *F02M 29/06* (2013.01); *F02M 35/10262* (2013.01); *Y02T 10/146* (2013.01)

(58) Field of Classification Search
CPC ........ F02B 27/0268; F02B 31/04; F02D 9/12; F02M 17/10; F02M 19/082; F02M 27/04; F02M 29/06; F02M 35/10262; F02M 9/124; Y02T 10/146

USPC .......... 123/184.55, 184.56, 337, 339.23, 403, 123/590–593, 683, 536–539; 48/189.4–189.6; 261/62, 79.1, 79.2
See application file for complete search history.

(56) References Cited

U.S. PATENT DOCUMENTS 3,167,305 A * 1/1965 Backxet al. .................... 366/338
3,778,038 A * 12/1973 Eversole et al. ............. 261/50.1
(Continued)

FOREIGN PATENT DOCUMENTS

| DE | 667050 | 11/1938 |
|---|---|---|
| DE | 2631968 | 12/1977 |

(Continued)

OTHER PUBLICATIONS

150128 IS_R PCT US 2014 035460.pdf.*

*Primary Examiner* — Erick Solis
*Assistant Examiner* — Carl Staubach
(74) *Attorney, Agent, or Firm* — Fish & Tsang LLP

(57) ABSTRACT

The inventive subject matter provides apparatus, systems and methods for treating a fuel prior to ignition in a combustion engine in order to improve efficiency. In one aspect of the invention a throttle valve system that entrains a flow of gas, which can include a fuel, into a structured flow pattern via the inclusion of topological on a surface of the valve body and/or the flow chamber. The topological features can be arranged in a pattern configured to produce movement and/or structured turbulence in a stream of gas that is introduced to the throttle valve. An excitation source that ionizes or cracks species in the gas stream can be optionally utilized.

6 Claims, 12 Drawing Sheets

(51) Int. Cl.
*F02D 9/12* (2006.01)
*F02M 17/10* (2006.01)
*F02M 19/08* (2006.01)
*F02M 27/04* (2006.01)

(56) References Cited

U.S. PATENT DOCUMENTS

| | | | | |
|---|---|---|---|---|
| 3,895,926 | A | * | 7/1975 | Lerner ............................ 95/219 |
| 3,938,967 | A | | 2/1976 | Reissmuller |
| 4,307,697 | A | | 12/1981 | Ong |
| 4,643,158 | A | * | 2/1987 | Giannotti ...................... 123/591 |
| 4,663,938 | A | * | 5/1987 | Colgate ........................... 60/620 |
| 5,302,325 | A | * | 4/1994 | Cheng ............................. 261/76 |
| 5,492,404 | A | * | 2/1996 | Smith ........................ 366/165.1 |
| 5,685,281 | A | | 11/1997 | Li |
| 6,113,078 | A | * | 9/2000 | Rock ............................... 261/21 |
| 6,250,796 | B1 | * | 6/2001 | Huang .......................... 366/270 |
| 6,276,330 | B1 | | 8/2001 | Adamisin et al. |
| 6,701,964 | B1 | | 3/2004 | Maurice |
| 6,824,125 | B2 | * | 11/2004 | Thomas ........................ 261/64.3 |
| 6,935,770 | B2 | * | 8/2005 | Schueler ...................... 366/174.1 |
| 6,990,964 | B2 | * | 1/2006 | Strohle .......................... 123/527 |
| 7,117,974 | B2 | * | 10/2006 | Moenssen et al. ............. 181/277 |
| 7,802,583 | B2 | | 9/2010 | Harman |
| 2003/0147303 | A1 | * | 8/2003 | Schueler ...................... 366/176.2 |
| 2004/0194751 | A1 | | 10/2004 | Limbrunner et al. |
| 2004/0237947 | A1 | * | 12/2004 | Strohle .......................... 123/527 |
| 2006/0263201 | A1 | * | 11/2006 | Harman .......................... 415/72 |
| 2007/0041266 | A1 | * | 2/2007 | Huymann .................. 366/162.4 |
| 2008/0314356 | A1 | * | 12/2008 | Kamen et al. .............. 123/197.3 |
| 2010/0281766 | A1 | * | 11/2010 | Livshits .......................... 44/458 |

FOREIGN PATENT DOCUMENTS

| | | | | |
|---|---|---|---|---|
| DE | 10347441 | | 5/2005 | |
| EP | 599195 | | 6/1994 | |
| GB | 2079849 | A * | 1/1982 | ............. F02B 31/02 |
| JP | 2001248449 | A | 9/2001 | |
| JP | 2002256874 | A | 6/2002 | |
| JP | 2012102623 | A | 5/2012 | |

* cited by examiner

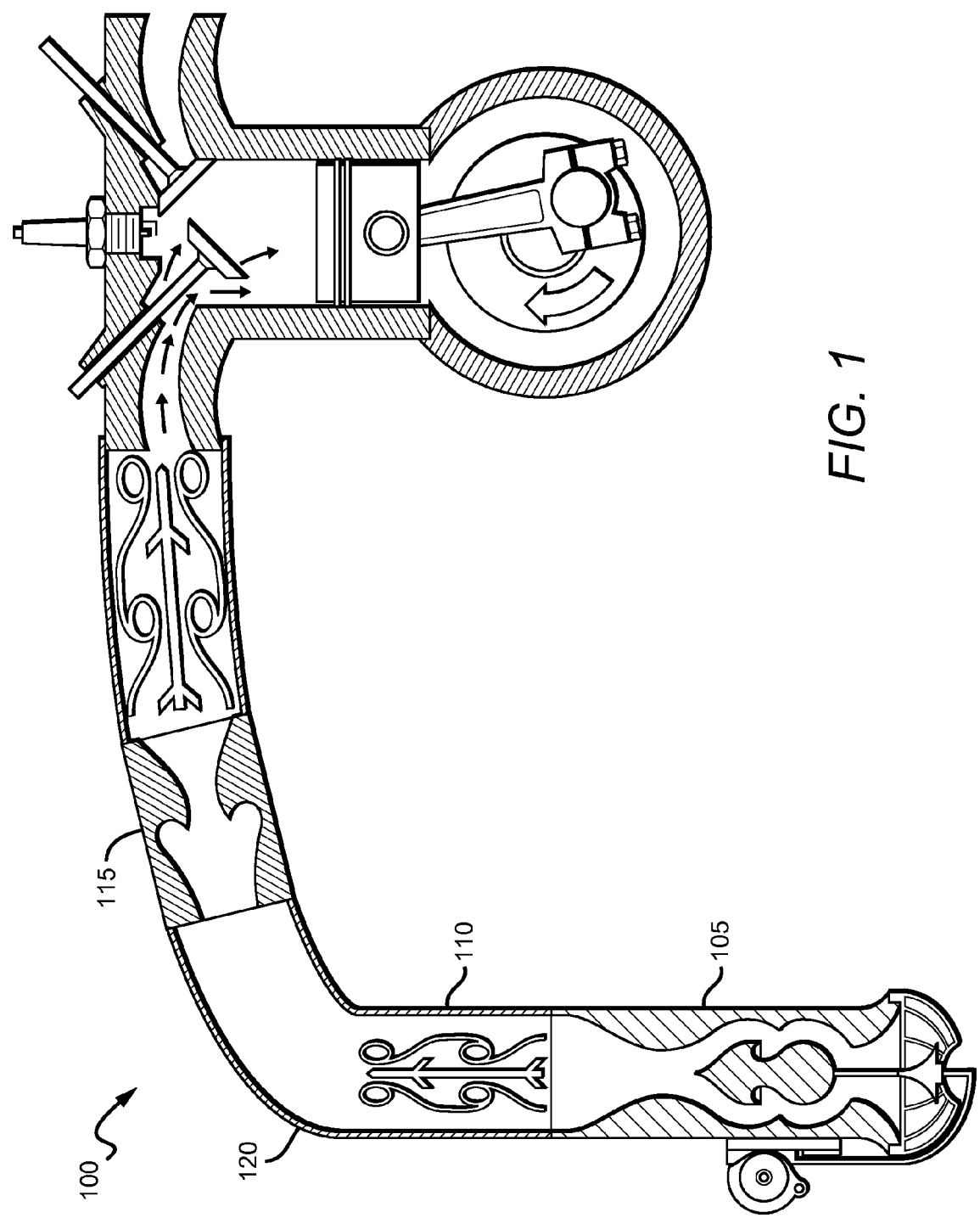

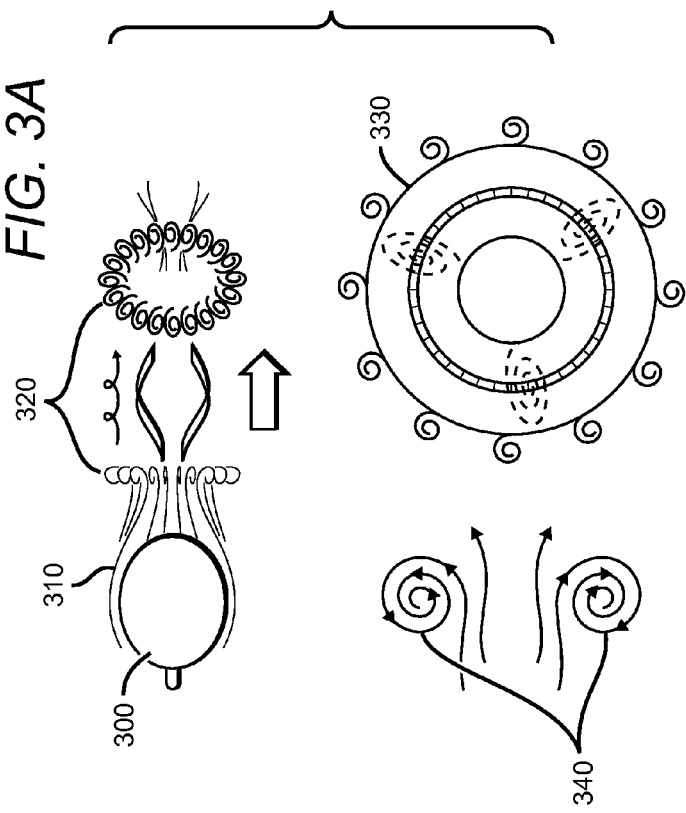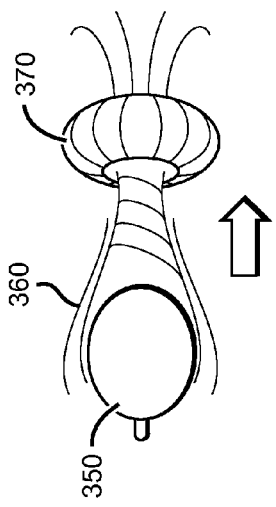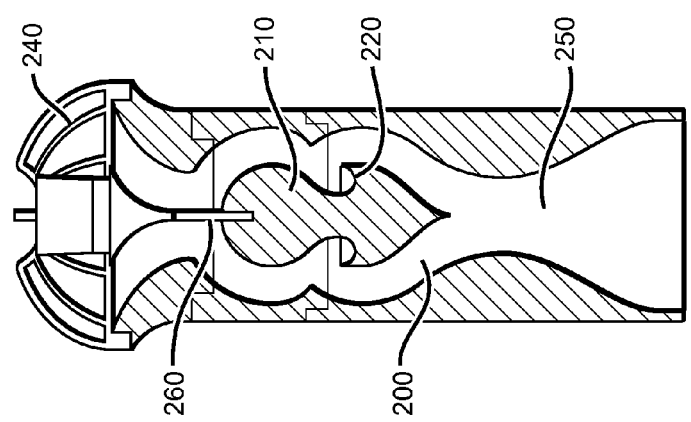

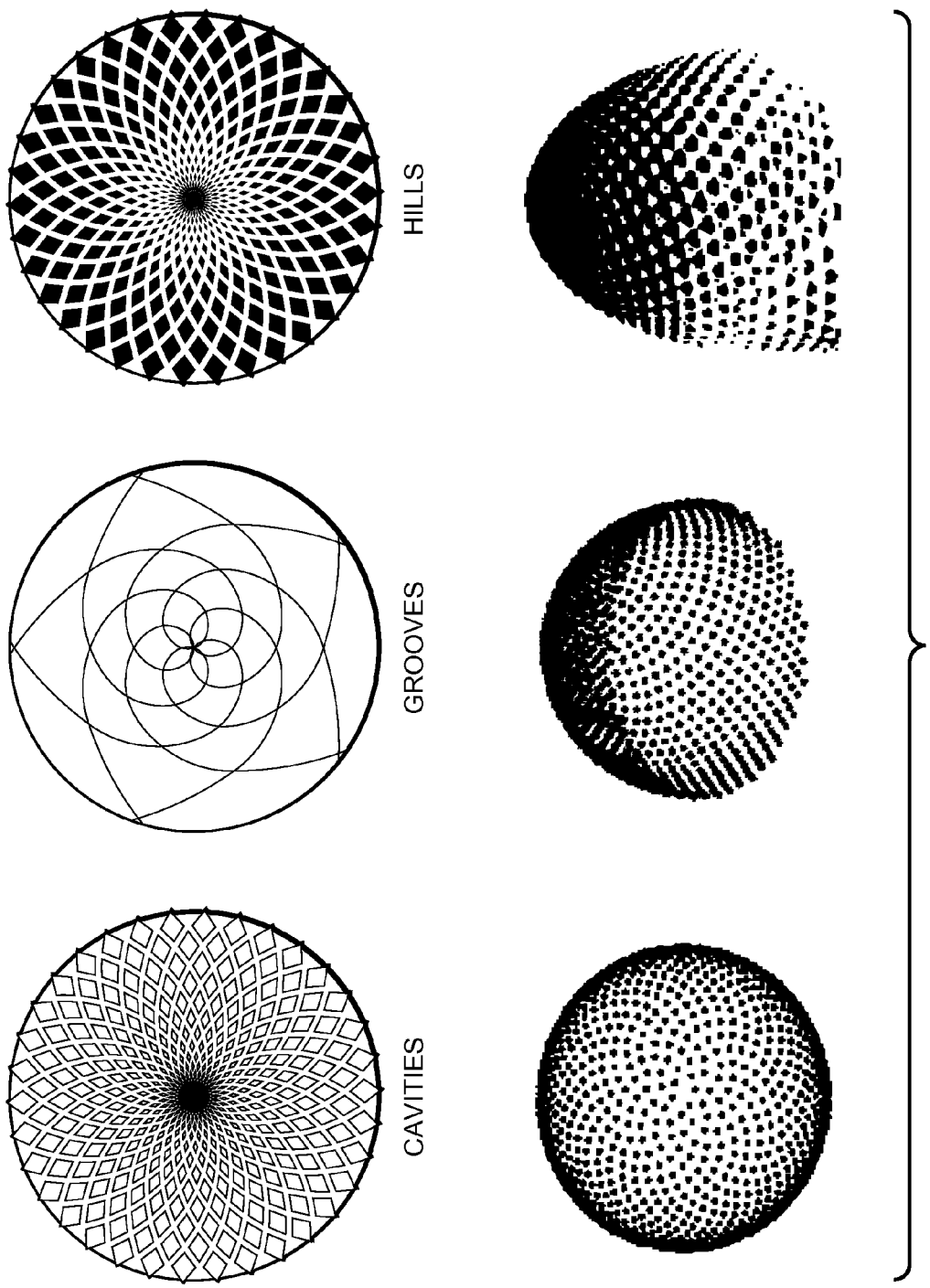

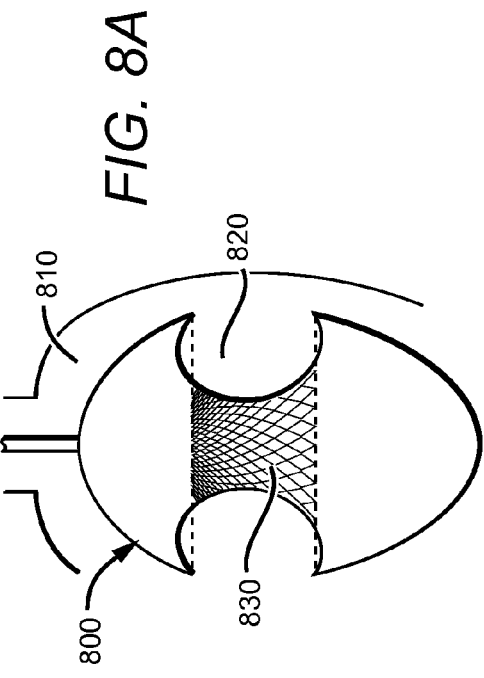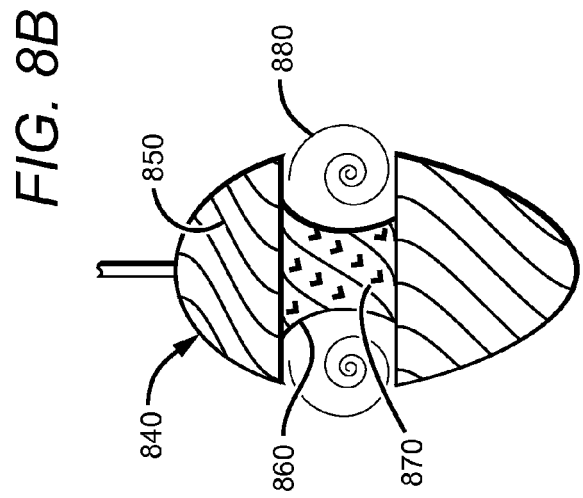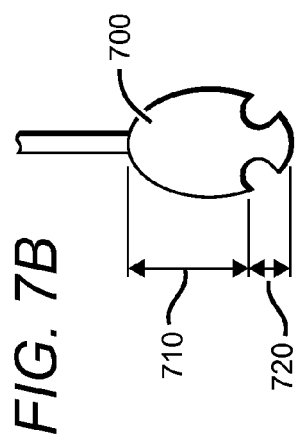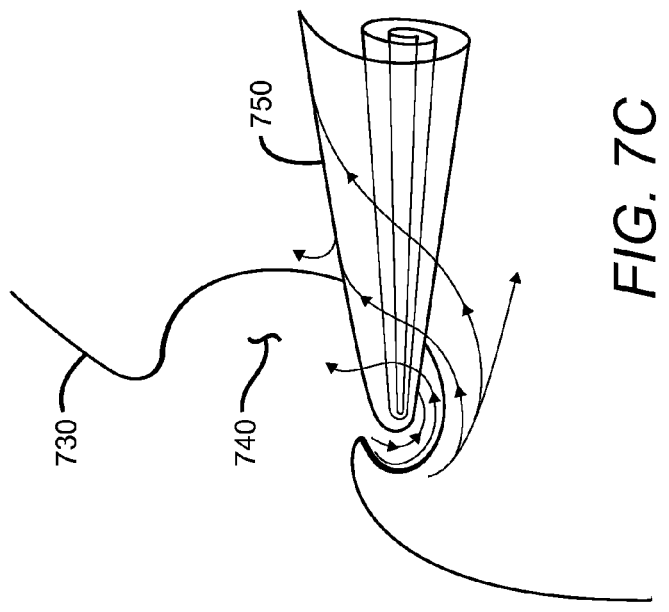

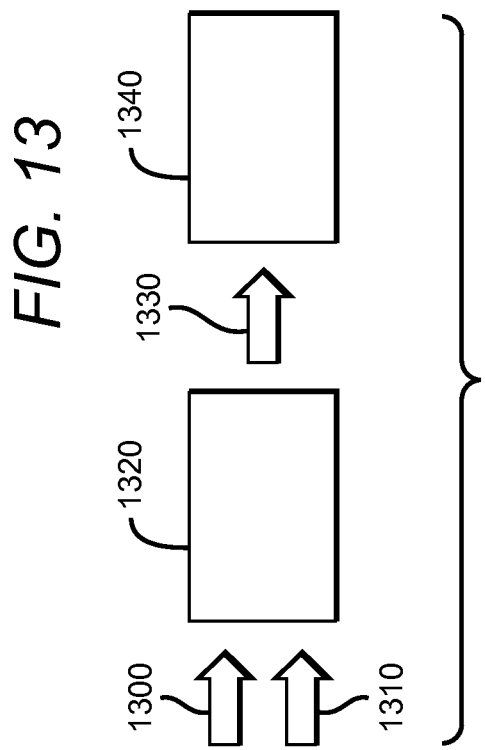
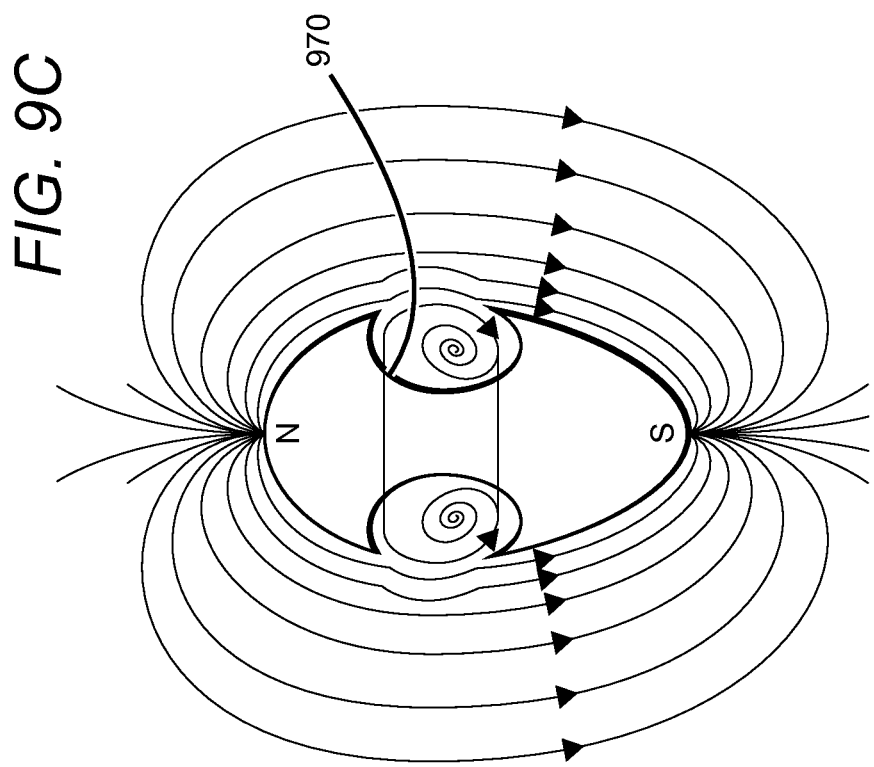

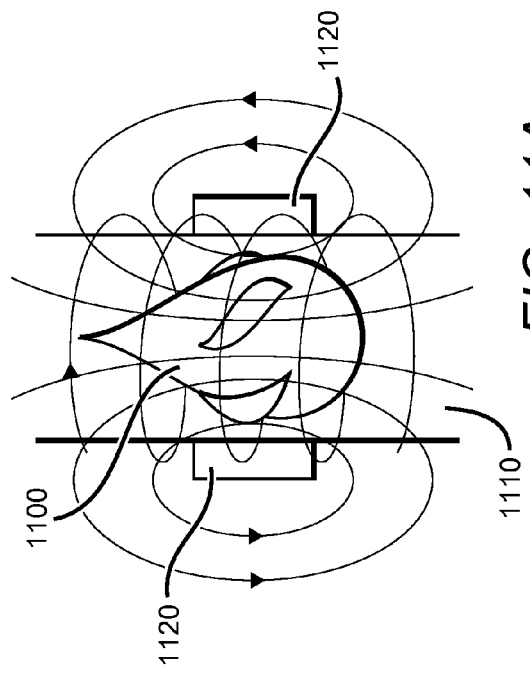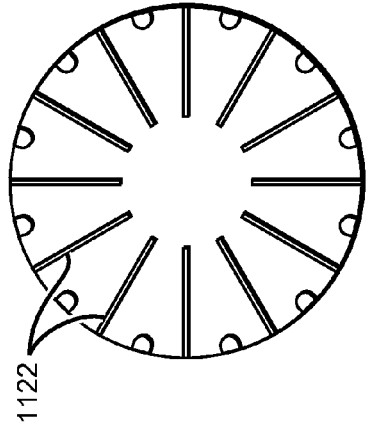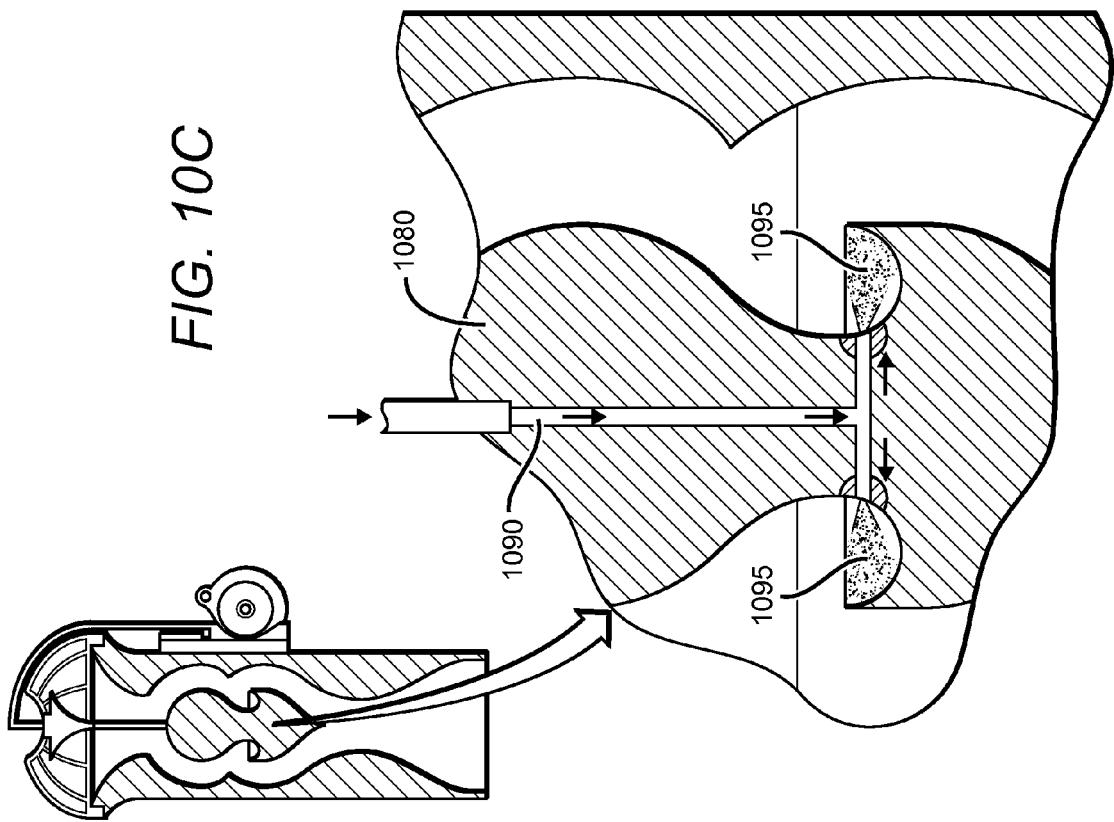

FUEL TREATMENT SYSTEM AND METHOD

This application claims priority to U.S. Provisional Application No. 61/762,224, filed Feb. 7, 2013. This and all other extrinsic materials discussed herein are incorporated by reference in their entirety.

FIELD OF THE INVENTION

The field of the invention is combustion engine system, more specifically, a fuel treatment system for a combustion engine.

BACKGROUND

The following description includes information that can be useful in understanding the present invention. It is not an admission that any of the information provided herein is prior art or relevant to the presently claimed invention, or that any publication specifically or implicitly referenced is prior art.

Internal combustion engines were developed early in the 19th century, and have been utilized to drive industrial equipment, generate electrical power, and provide motive power for vehicles. While the increasing cost of fuel and growing awareness of the environmental impact the use of internal combustion engines have led to the increasing popularity of hybrid and electric vehicles, internal combustion engines remain the dominant source of power for automobiles.

In an internal combustion engine (ICE) system, a mixture of fuel (e.g., gasoline, diesel fuel, natural gas) and an oxidant (e.g., air or oxygen) is injected into a combustion chamber. Upon ignition, the mixture combusts and produces gases (including steam, carbon dioxide, and other combustion products) and heat. The contents of the combustion chamber expand as they are heated. The expansion of these gases within the confined space of the combustion chamber generates force that drives the moving parts (e.g., pistons) of the engine. The return of the piston to its initial position at a subsequent point in the engine cycle ejects exhaust gases from the combustion chamber, which include unconsumed fuel and oxidant in addition to combustion products such as carbon dioxide and carbon monoxide. In short, an ICE system produces power by transforming chemical energy stored in the fuel and oxidant mixture into thermal energy and mechanical energy.

Even though ICEs have been in existence for a long period of time, they have not attained high efficiency levels. In fact, the sophisticated ICEs utilized in vehicles that are produced today are less than 20% efficient. The inefficiency of the ICE is, at least in part, a result of incomplete or partial combustion of fuel, which also results in the production of harmful pollutants such as carbon monoxide and soot. As such, improvements to the ICE's efficiency would be expected to reduce both fuel consumption and air pollution.

One approach to improve the efficiency of ICEs is to improve the efficiency of the combustion process. As a chemical process, complete oxidation of fuel requires careful control of the ratio between fuel and oxidant. For optimal efficiency this ratio should be consistent throughout the combustion chamber; the presence of regions within the combustion chamber with non-optimal fuel to oxidant ratios would lead to inefficient combustion within those regions. To this end various devices have been proposed to optimize the mixing of fuel and oxidant. Japanese patent application 2001248449 (by Hiroshisa et al, filed Mar. 7, 2000) describes the use of a rotatable valve element that acts to generate a swirling flow of air into the combustion chamber of an ICE. Japanese patent application 2002256874 (by Mitsuyuki, filed Mar. 2, 2001) describes a similar device with an asymmetrical rotatable valve element having both annular and elliptical portions. Similarly, Japanese patent application 2012102623 (filed Nov. 8, 2010) describes the use of a thin, rotatable planar valve element to control airflow at different rates of intake to generate a vortex of air entering a combustion chamber. All of these, however, rely on the use of failure prone moving parts to control airflow and generate the desired a vortex of air. In addition, control and optimization of mixing of fuel within this air vortex is not addressed.

In another approach to improving the efficiency of ICEs, U.S. Pat. No. 7,487,764 (to Lee, filed Feb. 21, 2008) discloses a pre-ignition fuel treatment system that strives to improve the efficiency of combustion (and subsequently reduce the production of unwanted of by-products) ionizing the fuel in a reactor vessel before entering into the combustion chamber. In addition, Lee further discloses the utilization of the high temperature, high pressure environment of the engine's exhaust gases to create a reaction zone in which the hydrocarbon molecules of the fuel are "cracked" to generate more readily combustible species. Ionization and cracking of fuel in the air fuel mixture are accomplished by passing the mixture over a rod of catalytic material in a smooth, laminar flow.

Despite the use of air vortices to improve mixing and and pre-ignition fuel treatment techniques, the efficiency of ICEs has yet to reach optimal levels. Thus, there is still a need to improve on existing ICE systems to further improve efficiency and reduce emission of harmful by-products.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention can contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems and methods in which a fuel is treated before ignition in a combustion engine in order to improve efficiency of the engine. In one aspect of the invention, a throttle valve system for an engine is presented. The throttle valve includes a valve body (which can be disposed within a flow chamber) that entrains a flow of gas, which can include a fuel, into a downstream flow pattern. This can be accomplished by the inclusion of topological or surface features on a surface of the valve body and/or the flow chamber. Such topological or surface features can have geometries and/or be arranged in a pattern configured to produce structured movement and/or turbulence in a stream of gas that is introduced to the throttle valve. The system can include an excitation mechanism that ionizes or otherwise modifies molecular species in a stream of gas that is introduced to the throttle valve.

In some embodiments of the inventive concept the downstream flow pattern can be a ring vortex, such as, for example, a toroid. In such an embodiment the concentration of gas can be higher within the center part of the ring vortex than in a radial portion of the ring vortex. In other embodiments of the inventive concept the downstream flow pattern can include a rotating movement, or can include both rotating and counter-rotating movements. Some embodiments of the inventive concept can produce micro-vortices in the flow of gas.

In another embodiment of the inventive concept the surface topology of the valve body and/or the flow chamber can include one or more pattern(s) of features including, but not limited to, bumps, dimples, cavities, ridges, grooves, and wedges. These features can be arranged in a pattern that is configured to produce movements in a gas stream. In some embodiments of the inventive concept the surface topology can include a first pattern of features and a second pattern of features, wherein the first pattern of features is configured to produce a first pattern of movements (for example, a rotation) in a gas stream and the second pattern of features is configured to produce a second pattern of movements (for example, a counter-rotation) in the gas stream. In some embodiments the pattern of features can be configured to produce a resonant vibration, such as, for example a Helmholtz resonance, within a stream of gas. In other embodiments of the inventive concept a pattern of features can be configured to produce intermittent movements in a gas stream, such that the throttle valve and/or components thereof can act as a pulsed excitation mechanism. Such features can be incorporate and/or be arranged in a phi-based or approximately phi-based configuration and/or pattern.

In an alternative embodiment of the inventive concept, the throttle valve can include an excitation mechanism. Suitable excitation mechanisms include, but are not limited, to an ultrasonic atomizer and/or an electrostatic field generator (such as, for example, one or more high voltage electrodes). Excitation can be applied to the throttle valve in an intermittent fashion, such that the throttle valve or components thereof act as a pulsed magnetic generator. Excitation mechanisms can be associated with the flow chamber, the valve body, or both the flow chamber and the valve body. In some embodiments of the inventive concept the flow chamber can act as a resonant cavity for the ultrasonic atomizer A valve body of the inventive concept can have a teardrop shape, a spheroidal shape, and ovoid shape, or a phi based shape, and can include one or more surface concavity(ies) that is(are) configured to compress or mix a downstream flow of gas. In some embodiments of the inventive concept the valve body includes an enclosed void and/or a channel. The valve body can be comprised of any suitable material, including, but not limited to, at least about 1% titanium (Ti), nickel (Ni), palladium (Pd), platinum (Pt), copper (Cu), zinc (Zn), or combinations of these.

In another embodiment of the inventive concept the valve body can be moved within the flow chamber. Such movements include, but are not limited to, translation along an axis of the flow chamber. Mechanisms utilized to produce such movement include, but are not limited to, an electromagnetic actuator and a non-electronic actuator. In some embodiments of the inventive concept an electromagnetic actuator magnetically levitates the valve body within the flow chamber.

Another embodiment of the inventive concept is a method for preparing fuel for use in an internal combustion engine, where a stream of gas (which can contain fuel) is entrained to produce an axially symmetrical downstream flow pattern and the stream of gas is directed into a combustion chamber of the engine. Suitable downstream flow patterns include, but are not limited to, a ring vortex or a toroid. In some embodiments of the inventive concept the center part of the axially symmetrical downstream flow pattern can contain a higher concentration of gas than a radial portion of the axially symmetrical downstream flow pattern.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1 is a schematic of an example fuel treatment system.

FIG. 2 depicts a throttle valve of the inventive concept, having a valve body within a flow chamber.

FIG. 3A illustrates generation of a ring vortex.

FIG. 3B depicts a toroid flow pattern.

FIG. 6A-6B provide examples of how features can be arranged on a valve body and/or flow chamber surface.

FIG. 7B shows an example of a phi based geometry for a valve body.

FIG. 7C illustrates and example of a valve body with a phi based surface feature.

FIG. 8A-8B show different surface pattern arrangements within a compression cavity.

FIG. 9C illustrates example magnetic fields induced by a valve body.

FIG. 10C depicts gas and/or fuel injection into a compression cavity of a valve body.

FIG. 11A depicts a valve body mounted within a flow chamber with adjacent excitation electrodes.

FIG. 11C depicts a bisection view of a valve body having arrays of electrodes.

FIG. 13 illustrates a method of the inventive concept.

DETAILED DESCRIPTION

Figure 5:
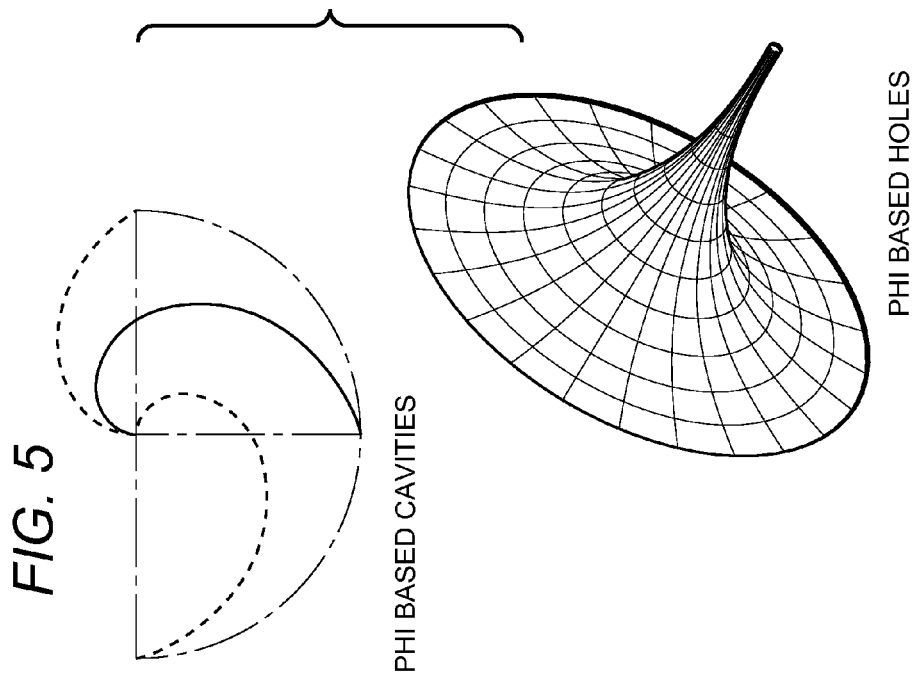
FIG. 5 illustrates phi based geometries that can be utilized in surface features of the inventive concept.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventive subject matter provides apparatus, systems and methods in which a gas, which can include a fuel (for example, as a vapor or in the form of suspended droplets) and/or an oxidant (such as air or oxygen), is treated before ignition in a combustion engine in order to improve efficiency of the engine. In one aspect of the invention, a throttle valve system for an engine is presented. The throttle valve includes a valve body (which can be disposed within a flow chamber) that entrains a flow of gas, which can include a fuel, into a downstream flow pattern. This can be accomplished by the inclusion of topological or surface features on surfaces of the throttle valve, such as the valve body and/or the flow chamber. Such topological or surface features can be arranged in one or more pattern(s) configured to produce a structured turbulence, such as a rotary movement or pattern, in a stream of gas that is introduced to the throttle valve. Such structured turbulence advantageously provides mixing of components of the gas stream (such as, for example fuel and air) for improved homogeneity and can be used to present untreated materials within a gas stream to active surfaces (such as catalytic and/or charged surfaces) for modification. Such patterns of gas movement include, but are not limited to, a ring vortex, a toroid, a vortex, and/or a micro-vortex. The throttle valve can include an excitation mechanism that induces movement and/or turbulence in a stream of gas that is introduced to the throttle valve. Such an excitation mechanism can also act to induce changes in charge or other properties of one or more molecular species in the gas stream.

In one embodiment of the inventive concept, a throttle valve is provided that permits entrainment of air and/or fuel gas streams into flow patterns that optimize combustion. Gas streams can be introduced to the throttle valve through a single inlet, or can be introduced through multiple inlets. In some embodiments of the inventive concept the throttle valve can include multiple gas inlets, with different sets of inlets being utilized under different operation conditions (for example, engine load). Such a gas stream can include droplets of liquid fuel.

FIG. 1 illustrates an example of such a fuel treatment system 100. In this figure, a throttle valve 105 is included along the intake pathway 110 before the fuel/air mixture reaches the combustion chamber of an engine. The throttle valve 105 entrains the fuel/air mixture to flow in a desired pattern that comprises ring vortices, toroid, or other types of axially-symmetric coherent downstream flow patterns. The throttle valve will be described in more detail below by reference to FIG. 2. To maintain or further enhance the flow pattern, the fuel treatment system 100 can also include different waveguides along the intake pathway 110. In some embodiments, the waveguides are implemented as a surface topology that includes bumps, dimples, cavities, ridges, grooves, and wedges located on the inner surface along the intake pathway 110. In some embodiments, the waveguides can also be implemented as a flow form, such as flow form 115, that restructures the fuel/air dynamic. The flow form 115 is especially useful when located at a location on the pathway after the fuel/air mixture has gone through a conduit, such as the conduit bend 120, that destroys the dynamic flow pattern of the fuel/air mixture.

An example of a throttle valve of the inventive concept is shown in FIG. 2. Gas is introduced to a flow chamber 200, which also houses a valve body 210. Gas flow over the surface of the valve body 210 and the walls of the flow chamber 200 serves to entrain the gas stream into a desired pattern that passes into the downstream flow chamber 250. The downstream flow chamber 250 can be in fluid communication with a combustion chamber. Towards that end the valve body 210 can include features that interact with the gas stream, for example a cavity 220. Such a cavity can be configured to produce regions of concentrated gas and/or to enhance mixing. The valve body 210 and/or the flow chamber 200 can also include patterned surface features that can entrain the gas stream, as discussed in further detail below. Such a throttle valve can also include features such as an air filter 240, which can serve to remove particulate contaminants from an oxidant gas stream, and a valve stem 260, which can serve to support the valve body 210. In some embodiments of the inventive concept a gas stream and or a fuel stream can be supplied through the valve stem 260.

In some embodiments of the inventive concept the downstream flow pattern of the gas can be a vortex. Such vortices can be generated, at least in part, by the overall geometry of a valve body, interaction of a gas stream with one or more patterns of features on a valve body, or by a combination of these. A valve body can include a plurality of patterned features. In such an embodiment a second set of patterned features can induce a rotating movement in a gas stream that is in an opposing direction (i.e. counter rotating) to the rotating movement induced by a first set of patterned features. A vortex can be a micro-vortex. In some embodiments of the inventive concept a micro-vortex has a diameter of less than 50% of the minimal distance between a valve body 210 and the wall of the flow chamber 200. In other embodiments a micro-vortex has a diameter of less than 10% of the minimal distance between a valve body 210 and the wall of the flow chamber 200. In still other embodiments of the inventive concept a micro-vortex has a diameter of less than 1% of the minimal distance between a valve body 210 and the wall of the flow chamber 200. FIG. 3A shows the generation of a ring vortex by a valve body 300 of the inventive concept. A flow of gas 310 (direction indicated by the arrow) over the valve body 300 entrains the gas flow into a ring vortex 320 (shown here in a lateral view). A frontal view of an exemplary ring vortex 330 shows circular rotation of the gas through the plane defined by the radius of the vortex. Similarly, a cross-sectional view of a ring vortex 340 shows rotary movement of the gas within the overall flow of the gas. FIG. 3B illustrates the formation of a toroid or toroidal pattern of gas flow by an embodiment of the inventive concept. A flow of gas 360 over a valve body 350 entrains the gas flow into a toroid 370, which can be subsequently be directed to a combustion chamber. As noted above, in such embodiments the concentration of gas can be higher within the center part of a vortex, such as a ring vortex, than in a radial portion of a vortex. In other embodiments of the inventive concept the downstream flow pattern can include a rotating movement, or can include both rotating and counter-rotating movements. Some embodiments of the inventive concept can produce micro-vortices in the flow of gas.

Figure 4:
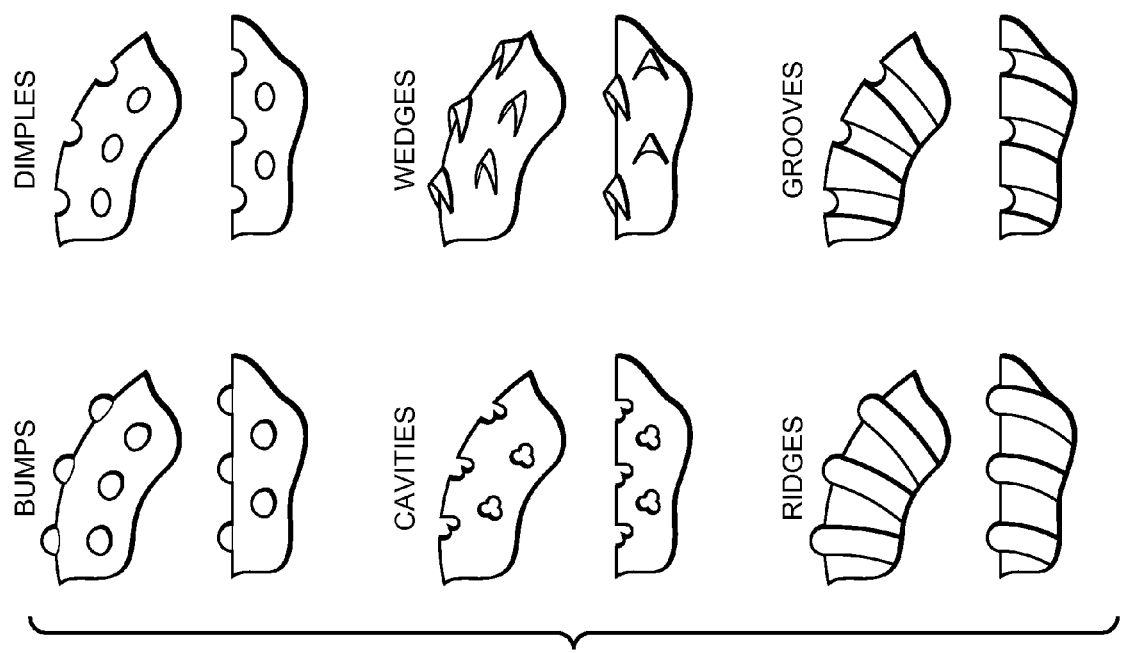
FIG. 4 illustrates a selection of exemplary surface features that can be utilized in a throttle valve of the inventive concept.

As noted above, embodiments of the inventive concept can include surface topologies of the valve body and/or the flow chamber and can include one or more pattern(s) of features including, but not limited to, bumps, dimples, cavities, ridges, grooves, and wedges. Examples of such features are shown in FIG. 4. Such features can incorporate and/or be arranged in phi-based geometries. As shown in FIG. 5, for example, a cavity or projection can have a phi-based cross-section in the form of a phi-based spiral. Similarly, a cavity or projection can have a geometry related to a rotation of a phi-based curve. These shapes provide a gradual but progressive change in pitch and/or slope that can be more effective in entraining gas flow along such surfaces than conventional symmetric forms. Although phi-based geometries are shown, it should be appreciated that other geometries can be suitable. For example, other Fibonacci sequence derived geometries, exponential spirals and/or curves, and logarithmic spirals and/or curves are also contemplated as suitable geometries for surface features and/or their arrangement. In addition suitable regular arraying patterns, such as hexagonal arrays, circular arrays, and rectangular/square arrays are also contemplated as suitable geometries for the arrangement of surface features.

Figure 6A:
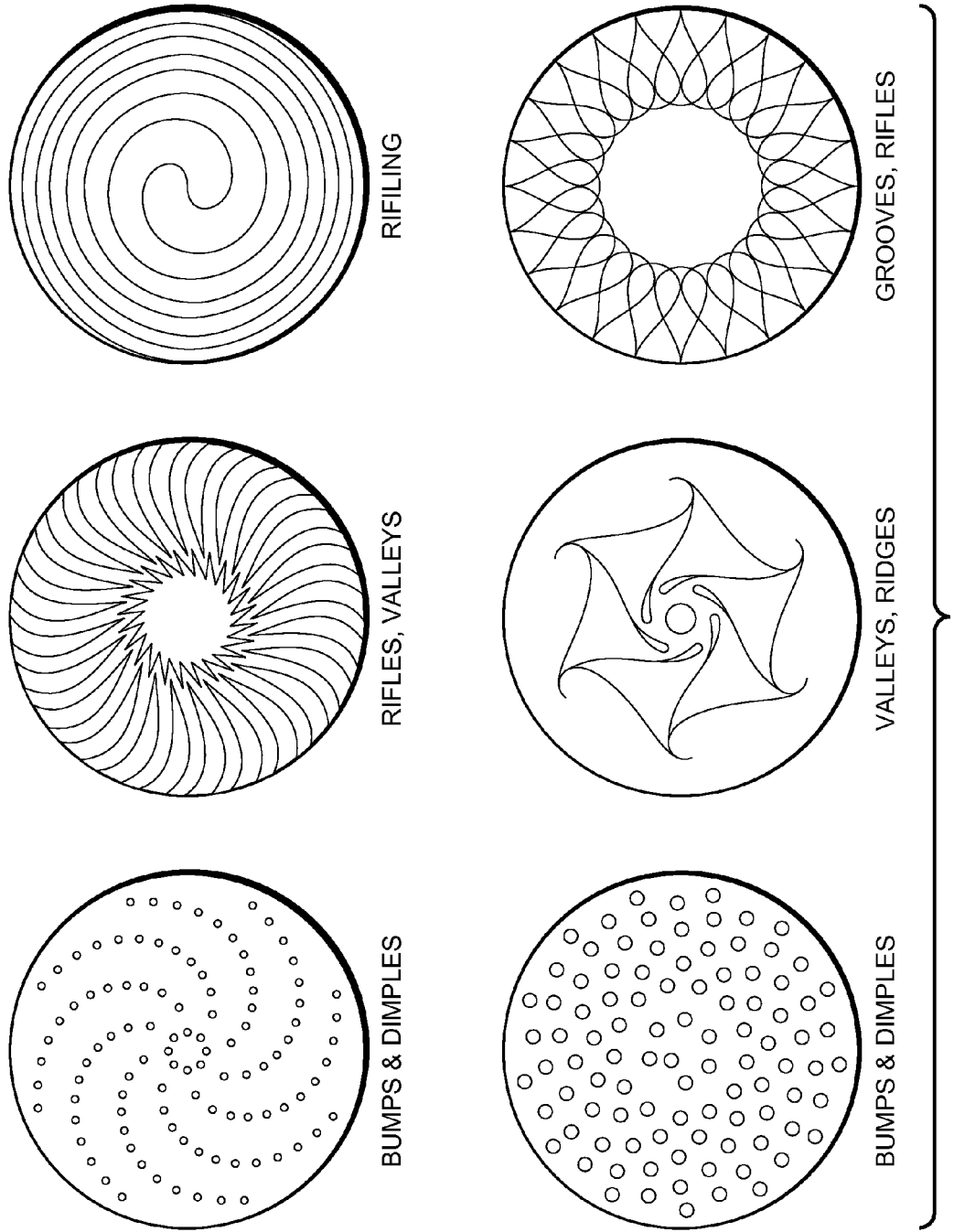
Figure 6C:
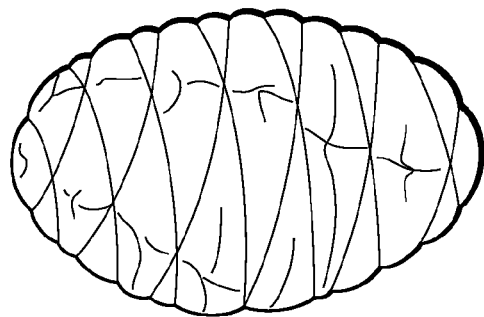
FIG. 6C depicts an example of a "pinecone" arrangement of surface features on a valve body.

Such surface features can be arranged in a pattern that is configured to produce movements in a gas stream. FIG. 6A and FIG. 6B illustrate a variety of examples of suitable patterns. FIG. 6C shows an embodiment of the inventive concept with a floral or "pine cone" arrangement of surface features and/or elements. As noted above, such arrangements of features can include phi-based geometries. These have the advantage of providing relatively efficient packing while maintaining good exposure of individual elements to the environment. However a variety of other geometries (including, but not limited to, Fibonacci sequence derived geometries, exponential spirals and/or curves, and logarithmic spirals and/or curves, hexagonal arrays, circular arrays, and/or rectangular/square arrays) are also contemplated. A plurality of patterns can be utilized, which can provide for the generation of varying local flow patterns within a device of the inventive concept. Similarly, a given pattern of features can include a plurality of feature types. In some embodiments of the inventive concept the surface topology can include a first pattern of features and a second pattern of features, wherein the first pattern of features is configured to produce a first pattern of movements (for example, a rotation) in a gas stream and the second pattern of features is configured to produce a second pattern of movements (for example, a counter-rotation) within the same gas stream. In other embodiments the pattern of features can be configured to produce a gas stream flow that generates a vibration. Such a vibration can match a resonant frequency of the throttle valve (or a portion thereof). In such an embodiment of the inventive concept the vibration within the gas stream can act as a resonant vibration (such as, for example a Helmholtz resonance). In still other embodiments of the inventive concept the pattern (or patterns) of features can be configured to produce intermittent movements and/or pressure changes in a gas stream. In such embodiments the throttle valve and/or components thereof can act as a pulsed excitation mechanism.

Figure 7A:
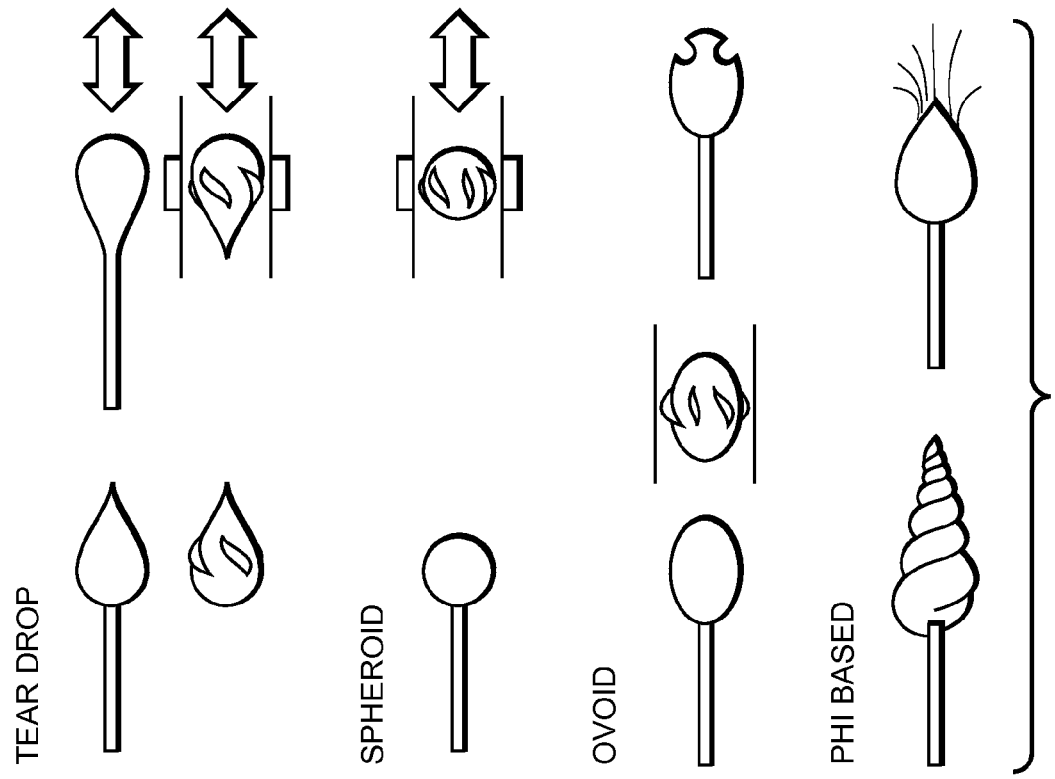
FIG. 7A depicts exemplary valve bodies with spheroid, ovoid, and phi based geometries.

In addition to patterned surface features, valve bodies (such as 200 of FIG. 2) can have a variety of shapes. As shown by examples in FIG. 7A, a valve body of the inventive concept can have a teardrop shape, a spheroidal shape, an ovoid (or egg) shape, and/or a phi based shape. In addition, as noted above, a valve body can include one or more surface concavity(ies), which can be circumferential. Such a concavity can be configured to compress and/or mix a downstream flow of gas. The position of a concavity on a valve body can have a phi-based geometry. An example of this is shown in FIG. 7B, where a valve body 700 has a first length 710 that is measured upstream from such a concavity and a second length 720 that includes the concavity and extends to the downstream terminus of the valve body 700. If the first length 710 is equal to a quantity A and the second length 720 is equal to a quantity B, than the ratio of A to B (i.e. A/B) can be approximately equal to the ratio of the sum of A and B to A (i.e. (A+B)/A). In other embodiments of the inventive concept the cross-section of such a concavity can also be represented by a phi-based geometry, such as a phi-based spiral. An example of this is shown in FIG. 7C, in which a valve body 730 includes a phi-based circumferential concavity 740. This entrains a stream of gas 750 flowing over the surface of the valve body 730 into a rotary movement that reflects this phi-based geometry. Inventors recognize, however, that other Fibonacci sequence based geometries, logarithmic geometries, and/or exponential geometries can also be suitable for placement of such a concavity on a valve body and/or for the geometry of the concavity itself.

As shown in FIGS. 8A-8B, such a concavity can include surface features or texturing. Such surface features or textures can differ from those found on other portions of a valve body. For example, as shown in FIG. 8A, a valve body 800 within a flow chamber 810 can have no surface features, but include a concavity 820 that incorporates patterned surface features 830. Similarly, FIG. 8B shows a valve body 840 with patterned surface features 850 and a concavity 860. The concavity 860 includes an additional set of patterned surface features 870 that serve to entrain a gas 880 flowing over the valve body 840 into a desired flow pattern.

Figure 9B:
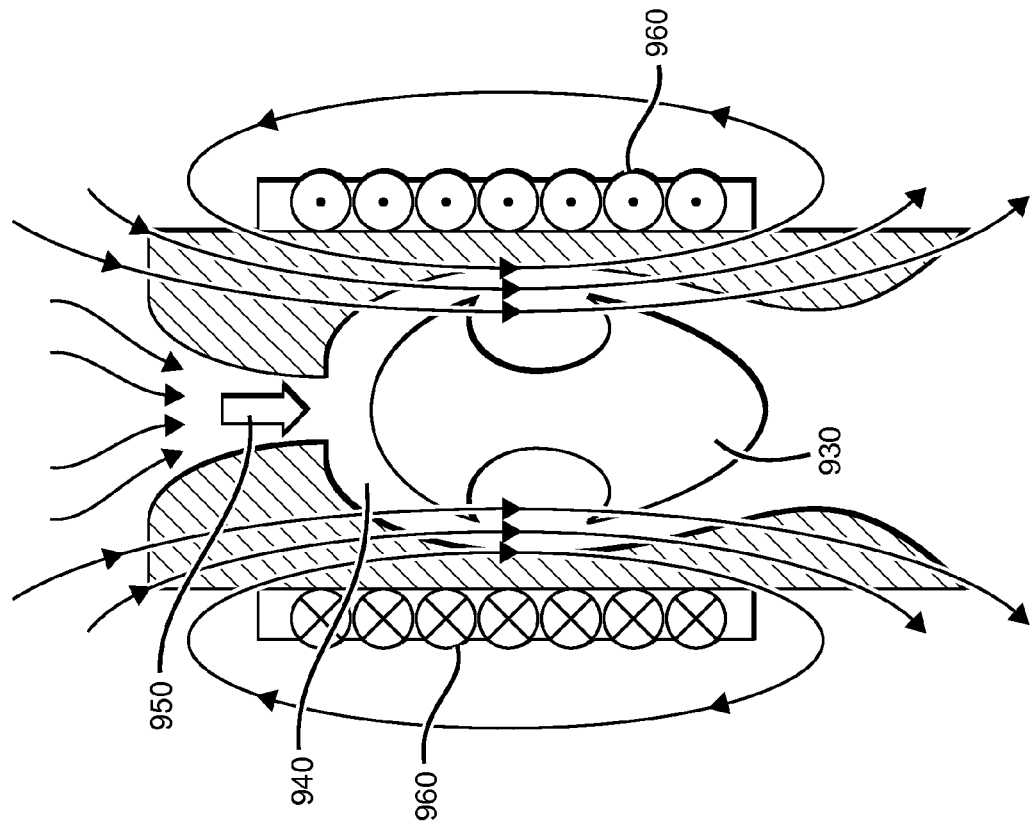
FIG. 9B shows an example of a valve body that is magnetically levitated.
Figure 9A:
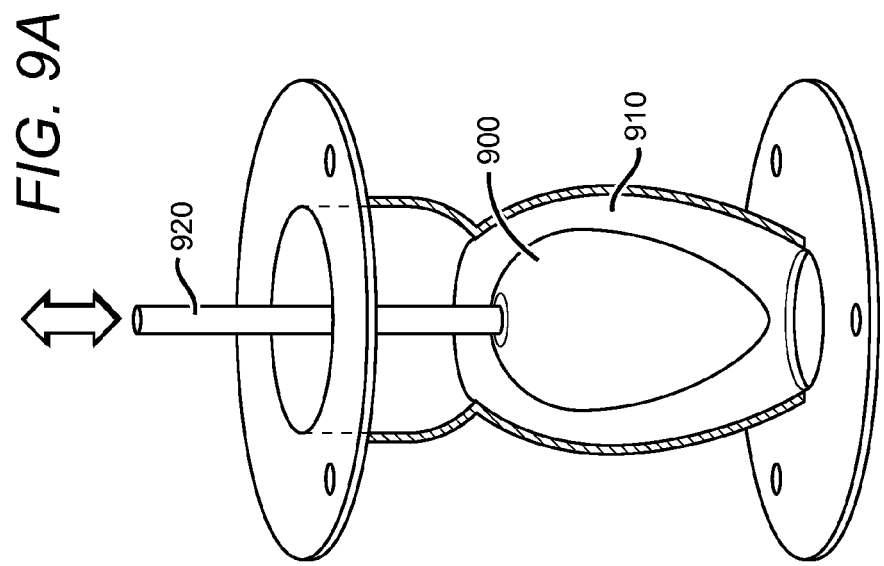
FIG. 9A shows a throttle valve with a mechanically actuated valve body.

As noted above, in a throttle valve of the inventive concept a valve body can be placed within a flow chamber. In some embodiments of the inventive concept, the valve body can be supported by an armature. As illustrated in FIG. 9A, a valve body 900 can be held in place within a flow chamber 910 by an armature 920. As indicated by the arrow, such an armature 920 can be movable, allowing adjustment of the position of the valve body 900 within the flow chamber 910. Such an armature 920 can be linked to a linear motor, a solenoid, a non-electronic actuator (such as, for example, a worm gear), or any suitable translation mechanism that permits controlled movement of the valve body 900. In some embodiments of the inventive concept such an armature can include a conduit or passage for transporting a fluid to the valve body. Alternatively, a valve body can be held within a flow chamber by magnetic suspension. As shown in FIG. 9B, a valve body 930 is held suspended within a flow chamber 940 by magnetic fields generated in coils 960. Such an embodiment has the advantage of not interfering with a flow of gas 950 into the flow chamber. The coils 960 can be electromagnets; in such an embodiment the position of the valve body 930 can be adjusted by manipulating current supplied to the electromagnetic coils. Alternatively, the coils 960 can be permanent magnets; in such an embodiment the position of the valve body can be adjusted by moving the coils relative to the flow chamber 940. Provision of mechanisms for movement of the valve body within the flow chamber permits optimization of the gas flow pattern for different operating conditions As shown in FIG. 9C, application of a magnetic field to a valve body can induce a magnetic field within the valve body itself, such magnetic fields can conform to concavities 970 of such valve bodies. Magnetic fields associated with a valve body can be utilized to manipulate the movement of charged and/or paramagnetic species in the gas stream flowing over the valve body. Alternatively, a valve body of the inventive concept can be constructed of magnetic materials and/or incorporate one or more electromagnets that provide for such magnetic fields in the absence of an applied magnetic field.

In some embodiments of the inventive concept the valve body can also include an enclosed void and/or a channel. Such a void or channel can be configured to transport fluids, such as a gas, liquid fuel, or a suspension of liquid fuel droplets. In addition, the composition of the valve body can include materials that serve to prevent corrosion, reduce surface buildup, and/or catalyze chemical reactions. Towards that end the valve body can be comprised of any suitable material, including, but not limited to, at least about 1% titanium (Ti), nickel (Ni), palladium (Pd), platinum (Pt), copper (Cu), zinc (Zn), or combinations of these. Such materials can be present as a bulk alloy or as a surface coating or plating. Alternatively, the valve body can be comprised of a ceramic material that incorporates metals such as titanium (Ti), nickel (Ni), palladium (Pd), platinum (Pt), copper (Cu), zinc (Zn), or other catalytic metals. In some embodiments of the inventive concept the valve body can include magnetic, diamagnetic, and/or paramagnetic materials.

Figure 10B:
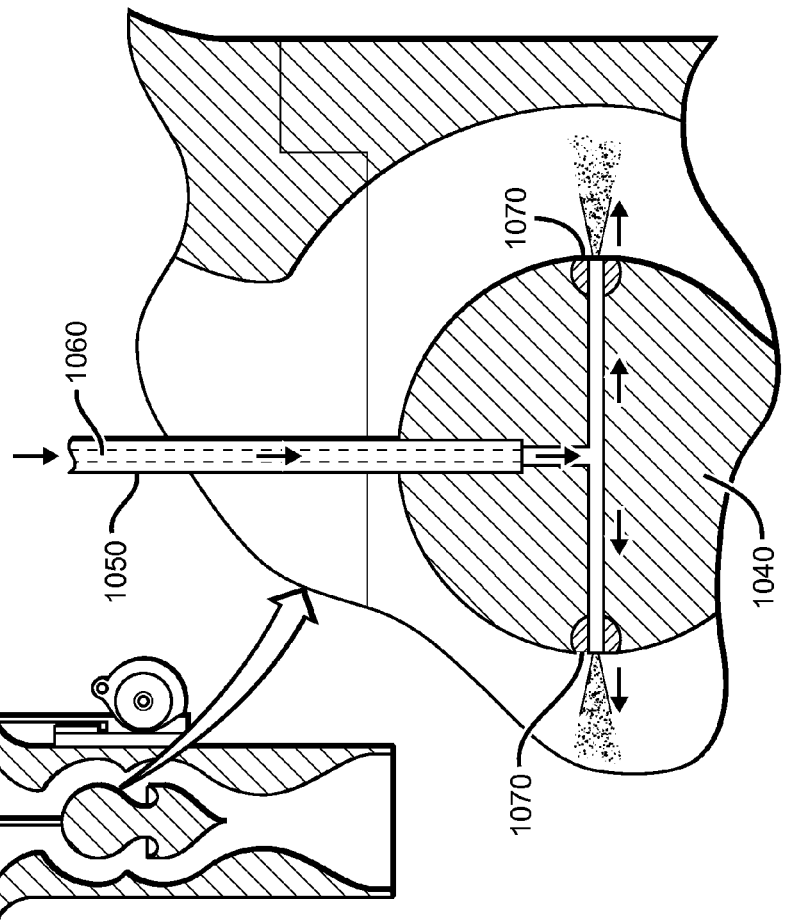
FIG. 10B depicts gas and/or fuel injection through a valve body, utilizing an atomizer.
Figure 10A:
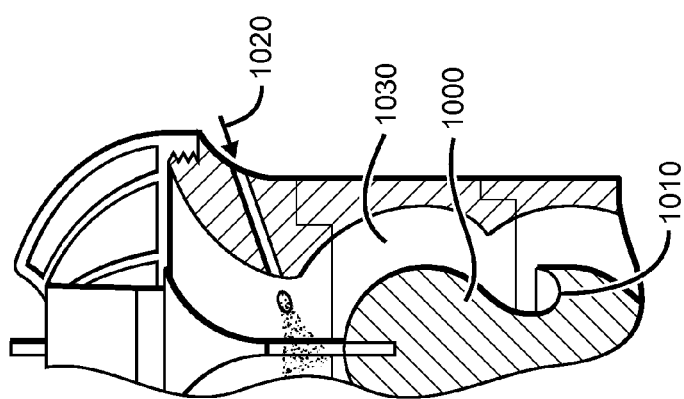
FIG. 10A depicts gas introduction through the wall of the flow chamber.

Gases, which can contain liquid droplets, can be introduced directly into the flow chamber of a throttle valve of the inventive concept, or can be introduced through the valve body. In one embodiment of the inventive concept, illustrated in FIG. 10A, a throttle valve with a valve body 1000 that has a concavity 1010, is configured such that gas 1020 is introduced into the flow chamber 1030 immediately upstream of the valve body 1000. In another embodiment of the inventive concept, shown in FIG. 10B, a valve body 1040 is supported by an armature 1050 that incorporates a conduit or passage 1060 that extends into the valve body 1040. Gas or fuel can be supplied to the throttle valve through the conduit 1060, where it is expelled through nozzles 1070 incorporated into the valve body 1040. Alternatively, such a valve body 1040 can include a piezoelectric or ultrasonic atomizer in association with the nozzle 1070. In still another embodiment of the inventive concept, shown in FIG. 10C, a valve body 1080 includes a conduit or channel 1090 that conducts gas and/or fuel to a concavity 1095 of the valve body. Such an embodiment advantageously dispenses gas and/or fuel directly into a region of vortex formation.

In some embodiments of the inventive concept, the throttle valve can include an excitation mechanism. Excitation mechanisms can be associated with the flow chamber, the valve body, or both the flow chamber and the valve body. In some embodiments excitation can be applied in an intermittent fashion, such that the throttle valve or components thereof act as a pulsed magnetic generator. Such an excitation mechanism can act to induce or change flow of a gas, for example, by introducing pressure waves via ultrasound. An excitation mechanism can also act to modify one or more molecular species within the gas stream. For example, an excitation can act to introduce a charge and/or induce a dipole moment in one or more molecular species present in the gas stream. Such an excitation mechanism can act to break a molecular bond or "crack" one or more molecular species in the gas stream, resulting in the generation of, for example, low molecular weight species and/or free radicals. Such charged species can be manipulated utilizing electrical, electrostatic, and/or magnetic fields, advantageously providing additional mechanisms for control of gas flow and composition. To further facilitate the ionization process a valve body can include a magnetic, diamagnetic, or paramagnetic material. In such an embodiment, as ionized gas molecules move around/along the valve body, they magnetize the valve body. As the valve body is magnetized, it generates its own magnetic field, which further ionizes the gas and moves the gas molecules at greater speed. The faster motion of the fuel molecules in turn strengthens the magnetization of the valve body. Thus, the ionized gas molecules and the magnetizable valve body create a positive feedback loop that eventually drives at least some of the fuel into a plasma state. This effect can be enhanced by the structured flow provided by the shape and/or patterned surface features of the valve body and/or flow chamber (as discussed above), which provides vortex and/or microvortex flow that introduces untreated material to surfaces that are under the influence of the excitation mechanism. Charged species thus produced can be in the form of a cold or a hot plasma. Such charged and/or fragmented molecular species can be combusted more efficiently, leading to enhanced engine economy and reduced production of unwanted pollutants and partial combustion products. Studies have shown that ionization (also known as "cracking", which refers to the breaking down of the hydrocarbon molecules in the fuel) of the fuel before combustion allows the fuel to combust more efficiently, as disclosed in U.S. Pat. No. 7,487,764 (to Lee) entitled "Pre-ignition Fuel Treatment System", filed Aug. 10, 2007. The excitation mechanism can act in conjunction with other components of the throttle valve. For example, cracking can be facilitated by the presence of catalytic metals such as titanium (Ti), nickel (Ni), palladium (Pd), platinum (Pt), copper (Cu), zinc (Zn), or combinations of these in or on the valve body and/or the flow chamber.

Suitable excitation mechanisms include, but are not limited, ultrasonic devices (such as, for example, an atomizer). In such an embodiment the flow chamber can be configured to act as a resonant cavity. Such an ultrasonic device can be incorporated into one or more components of the throttle valve, for example the ultrasonic atomizer associated with valve body 1040. Alternatively, the throttle body can be placed within an effective distance of an ultrasonic probe or emitter. In such an embodiment the flow chamber can be configured as a resonance cavity for the ultrasound thus utilized. In other embodiments of the inventive concept the excitation mechanism can generate an electrical field. Such an electric field can be dynamic or static (i.e. an electrostatic field). Suitable electric field excitation mechanisms include, but are not limited to or more high voltage electrodes and electric coils. FIG. 11A shows a valve body 1100 within a flow chamber 1110, with a pair of high voltage electrodes 1120 arranged outside of the flow chamber 1110 and adjacent to the valve body 1100. Energizing the electrodes 1120 provides an electrostatic field that penetrates the flow chamber 1110 and act upon components and molecular species contained therein.

Figure 11B:
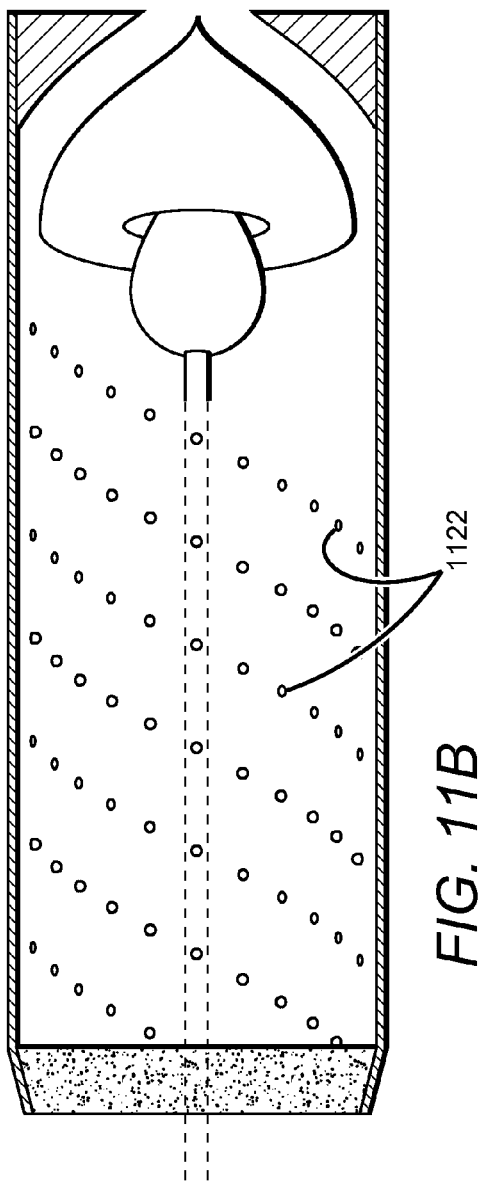
FIG. 11B depicts a side view of a valve body having arrays of electrodes.

In some embodiments, the many small high voltage electrodes (e.g., can be needle-like or flush, etc.) can be arranged on the surface of the flow chamber of the throttle valve to ionize the fuel/air mixture. FIG. 11B and FIG. 11C illustrate an example of these embodiments. FIG. 11B shows a side view of a throttle valve. As shown, small electrodes 1122 are arranged on the surface of the flow chamber in a spiral pattern. Arcs can be generated between the electrodes 1122 causing a breakdown of the dielectric air. In addition, each electrode's voltage can vary in order to provide a cascading voltage array. This cascading voltage array in some embodiments can create an acceleration of ions within the fuel/air mixture. FIG. 11C illustrates a bisection view of the throttle valve which shows electrodes 1122, in needle-like shape, protruding into the flow chamber.

Figure 12:
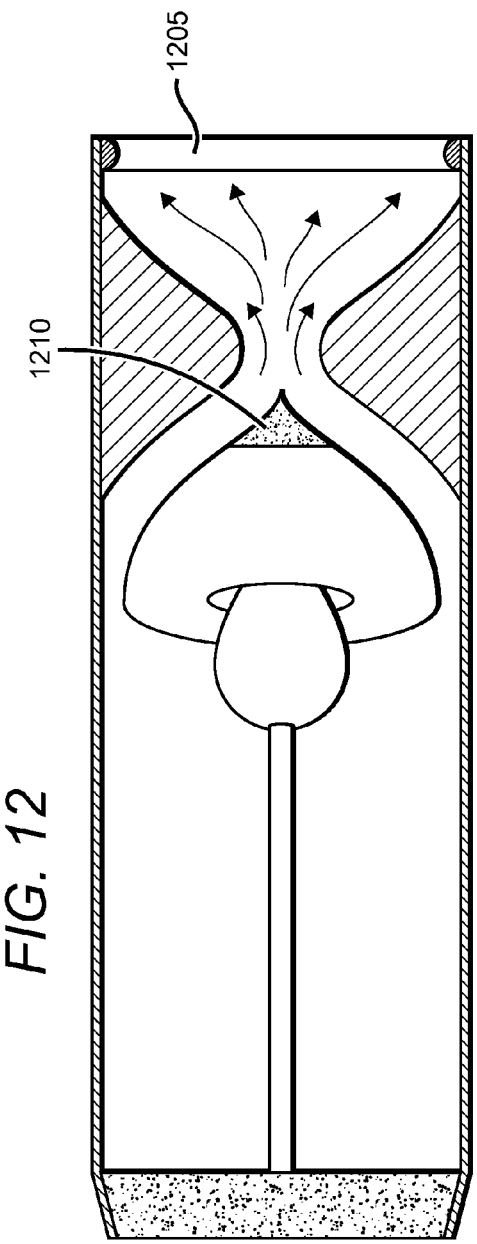
FIG. 12 illustrates an example throttle valve with a downstream electrode ring.

In some embodiments, additional electrodes can also be placed downstream of the throttle valve to accelerate charged fuel particles through the nozzle. FIG. 12 illustrates example throttle valve of such an embodiment. In this figure, a high voltage electrode ring 1205 with a positive charge is placed downstream of the throttle valve, and an electrode 1210 with a negative charge is located at the tip of the valve body. The high voltage electrode ring 1205 and electrode 1210 help accelerates the ionized fuel/air mixture out of the valve body.

Another embodiment of the inventive concept is a method for preparing fuel for use in an internal combustion engine. An example of such an embodiment is shown in FIG. 13, where a stream of gas 1300 is introduced to an entraining device 1320, such as, for example, a throttle valve. In some embodiments a secondary gas stream 1310 can be introduced at substantially the same time as the primary stream of gas 1300. Either or both of these gas streams can contain fuel. Gas exits the entraining device as an entrained gas stream 1330. Such an entrained gas stream 1330 can have an axially symmetrical downstream flow pattern, such as a ring vortex or a toroid. The center part of entrained gas stream 1330 can contain a higher concentration of gas than a radial portion. Upon exiting the entraining device 1320 the entrained gas stream 1330 is directed to a combustion chamber 1340 of the engine.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A throttle valve for an internal combustion engine comprising a combustion chamber, comprising:
    a flow chamber configured to direct a stream of mixture comprising gas and fuel to the combustion chamber of the internal combustion engine; and
    an ovoid-shaped valve body having a continuous circumferential groove disposed on the valve body's outer surface and wherein the opening of the groove is smaller than a maximum width of the groove, the valve body disposed within the flow chamber and axially translatable with respect to the flow chamber for controlling a flow volume of the stream of mixture,
    wherein the groove is configured to entrain the stream of mixture, to produce an axially-symmetric coherent downstream flow pattern.

2. The throttle valve of claim 1, wherein the downstream flow pattern comprises a ring vortex.

3. The throttle valve of claim 2, wherein the ring vortex has a higher concentration of gas in a center part of the ring vortex than in a radial portion of the ring vortex.

4. The throttle valve of claim 1, wherein the downstream flow pattern comprises a toroid.

5. A method of preparing fuel for use in an internal combustion engine, comprising:
    directing a mixture comprising gas and fuel to flow downstream in a flow chamber toward a combustion chamber of the internal combustion engine, wherein the flow chamber comprises an ovoid-shaped valve body having a continuous circumferential groove disposed on the valve body's outer surface, wherein the opening of the groove is smaller than a maximum width of the groove;
    entraining, by using the valve body, the stream of mixture to produce an axially-symmetric coherent downstream flow pattern; and
    directing the stream of mixture into the combustion chamber of the engine.

6. A throttle valve for an internal combustion engine comprising a combustion chamber, comprising:
    a flow chamber configured to direct a mixture of gases to the combustion chamber of the internal combustion engine; and
    an ovoid-shaped valve body having a continuous circumferential groove disposed on the valve body's outer surface and wherein the opening of the groove is smaller than a maximum width of the groove, the valve body disposed within the flow chamber and axially translatable with respect to the flow chamber for controlling a flow volume of the mixture,
    wherein the groove is configured to entrain the mixture, to produce an axially-symmetric coherent downstream flow pattern.

* * * * *